United States Patent [19]

Elders

[11] 4,325,657
[45] Apr. 20, 1982

[54] ROOF SUPPORT PIN

[76] Inventor: Gerald W. Elders, 38 Yakashba Estates, Prescott, Ariz. 86301

[21] Appl. No.: 100,449

[22] Filed: Dec. 5, 1979

[51] Int. Cl.³ .................... E21D 21/00; E21D 20/00
[52] U.S. Cl. .................................. 405/259; 411/371; 411/454
[58] Field of Search ................ 405/259, 260, 261; 85/63; 411/454, 371

[56] References Cited

U.S. PATENT DOCUMENTS

| | | | |
|---|---|---|---|
| 1,176,456 | 3/1916 | Hutter | 85/75 |
| 1,667,268 | 4/1928 | Pleister | 85/63 |
| 3,899,893 | 8/1975 | Banerjee et al. | 405/259 |
| 4,098,087 | 7/1978 | Swain | 405/259 |
| 4,126,004 | 11/1978 | Lindeboom | 405/259 |

Primary Examiner—Dennis L. Taylor
Attorney, Agent, or Firm—Cohn, Powell & Hind

[57] ABSTRACT

A roof support pin for insertion into the strata of the roof including an elongate rod having a non-circular cross-section to provide corners, the rod being twisted so that the corners provide longitudinal substantially helical fins for turning into and gripping the roof strata as the rod is inserted into the roof. A roof support plate is provided with an aperture having a cross-section with corners that engage the corners of the rod cross-section for turning the rod into the roof strata as the rod is moved longitudinally relatively through the aperture. The roof support plate grips the roof and precludes relative turning of the plate and roof as the rod is moved longitudinally through the plate aperture and is twisted into the roof strata. After the rod is inserted into the roof, the roof support plate grips the roof, and precludes relative turning of the plate and rod and precludes untwisting of the rod from the roof strata upon application of a downward longitudinal load force applied axially through the pin by the roof. The roof support pin can be utilized in a roof having a preformed longitudinal hole of smaller cross-sectional dimension than the rod cross-sectional dimension or the rod can form its own longitudinal hole as the rod is turned upon longitudinal movement through the plate aperture incident to insertion of the rod into the roof, the helical fins cutting into the walls of a preformed hole and cutting into the roof strata as the rod forms its own longitudinal hole to provide its own helical grooves, for gripping the roof strata.

10 Claims, 6 Drawing Figures

U.S. Patent    Apr. 20, 1982    Sheet 2 of 2    4,325,657
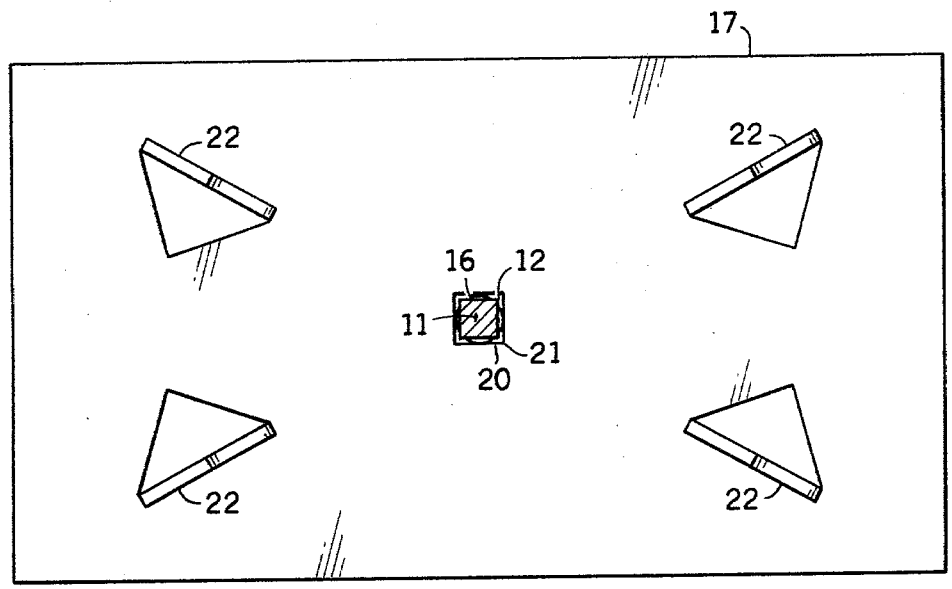
FIG. 3
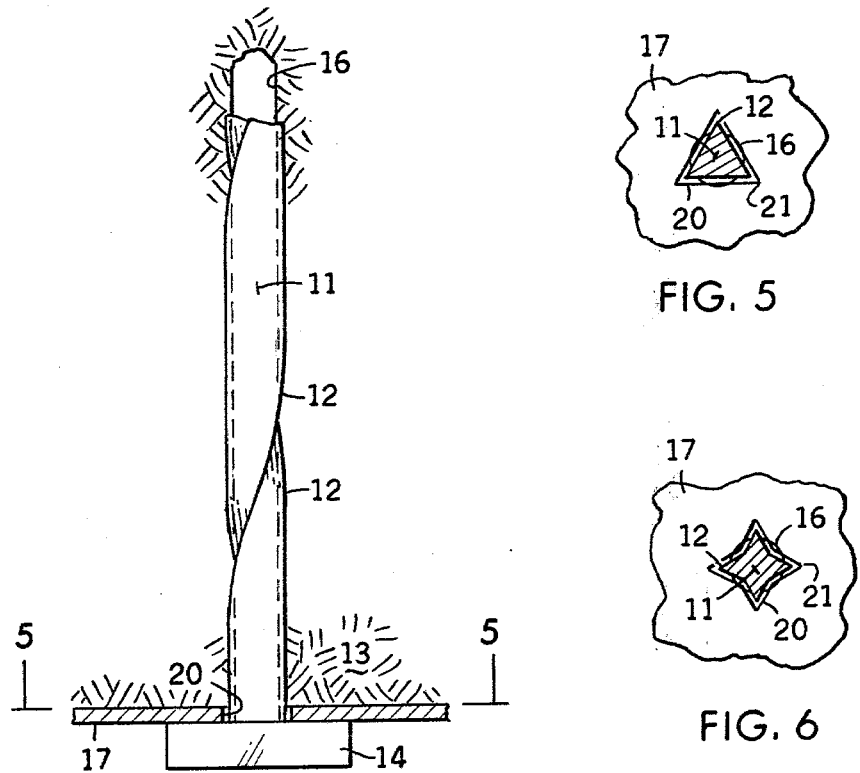
FIG. 4
FIG. 5
FIG. 6

ROOF SUPPORT PIN

BACKGROUND OF THE INVENTION

This invention relates generally to an improved roof support pin, and more particularly to an improved construction of an elongate rod and of a roof support plate for inserting the rod into the roof strata, and for precluding removal of the rod after insertion upon application of a longitudinal axial load force applied by the roof through the rod.

In the heretofore conventional roof support pins, one type of such pin utilized an expansion shell that was positively expanded against the wall of a preformed hole, after the pin had been fully inserted, to grip the wall and anchor the pin. This type of roof pin with an expansion shell provided an initial, adequate holding force but such force deteriorated with time as the wall of the roof strata engaging the expansion shell changed its characteristics. Another type of roof support pin included an elongate tube having a longitudinal split which allowed the tube to be reduced in size as the tube was forced into a preformed hole of smaller cross sectional dimension. This split tube type of roof support pin provided usually an inadequate initial holding force with the roof strata, but was more effective as time passed and relative lateral shifting of the roof strata occurred, causing deformation of the tube.

SUMMARY OF THE INVENTION

The present roof support pin provides an initial adequate and effective roof support engagement with the roof strata, and such effective roof engagement and roof support action increases with the passage of time as the lateral shifting of the roof strata occurs. Moreover, the present roof support pin can be easily inserted, and the gripping action of the pin can be controlled by the judicous selection of the length of the effective engagement of the helical fins formed by the elongate rod and by the depth of the grooves formed by the helical fins during insertion.

The present roof support pin includes an elongate rod having a non-circular cross-section to provide corners, the rod being twisted so that the corners provide longitudinal substantially helical fins for turning into and gripping the roof strata as the rod is inserted longitudinally into the roof. Preferably, the rod is twisted in one direction substantially along its length.

A roof support plate is provided with an aperture having a cross-section with corners that engage the corners of the rod cross-section for turning the rod into the roof strata as the rod is moved relatively longitudinally through the plate aperture.

In one embodiment, the rod cross-section and the roof support plate aperture cross-section are substantially square, providing four corners that effectively interengage. In this embodiment, the elongate rod is provided with four helical fins.

In another embodiment, the rod cross-section and the roof support plate aperture cross-section are substantially triangular, providing three corners that effectively interengage. In this embodiment, the rod is provided with three helical fins.

In still another embodiment, the rod cross-section and the roof support plate aperture cross-section are substantially a cruxiform, providing four corners that effectively interengage. In this embodiment, the rod is provided with four helical fins.

The roof support plate is provided with means for gripping the roof and for precluding turning of the plate on and relative to the roof as the rod is moved longitudinally through the plate aperture and is turned into the roof strata.

After the rod is inserted into the roof, the roof support plate grips the roof and precludes relative turning of the plate and roof, and precludes relative turning of the plate and rod to preclude untwisting and removal of the rod from the roof strata upon application of the load support force from the roof axially on the elongate rod and on plate.

The roof support pin can be utilized in a roof having a preformed longitudinal hole of smaller cross-sectional dimension than the rod cross-sectional dimension. In this instance, the helical fins cut into the walls of preformed hole to provide their own helical grooves. In the instance in which a preformed hole is not used, the helical fins cut into the roof strata provide their own helical grooves as the rod forms its own longitudinal hole.

BRIEF DESCRIPTION OF THE DRAWINGS

FIG. 3 is a top plan view of the roof support plate, taken on staggered line 3—3 of FIG. 1;

FIG. 4 is a fragmentary side elevational view of another embodiment of the roof support pin and its cooperating roof support plate;

FIG. 5 is a fragmentary cross-sectional view taken on line 5—5 of FIG. 4, and

FIG. 6 is a fragmentary cross-sectional view of another embodiment taken on cross-sectional line providing a view similar to FIG. 5.

DESCRIPTION OF THE PREFERRED EMBODIMENT

Figures 1, 2:
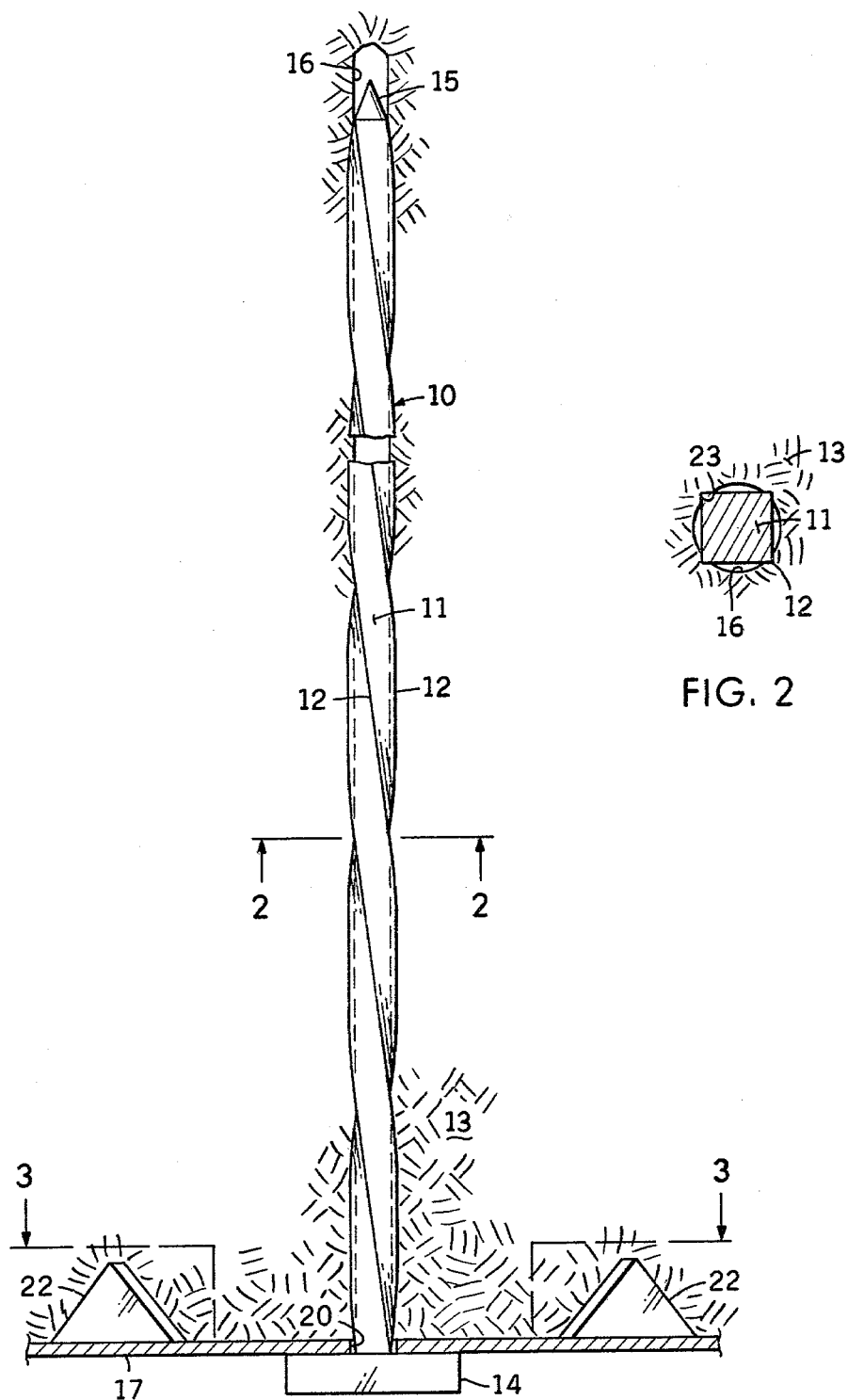
FIG. 1 is a fragmentary side elevational view of one embodiment of the roof support pin, showing the roof support plate, partly in cross-section.
FIG. 2 is an enlarged cross-sectional view taken on line 2—2 of FIG. 1.

Referring now by characters of reference to the drawings, it will be understood that the roof support pin generally indicated by 10 includes an elonage rod 11 having a non-circular cross-section to provide corners 12. The rod 11 is twisted in one direction substantially along its axial length so that the corners 12 provide longitudinal substantially helical fins for turning into and gripping the rock strata 13 as the rod 11 is inserted into the roof. A head 14 is provided at one end of the rod 11 for holding the pin 10 incident to insertion into the roof. The opposite end 15 of the rod 11 is provided with a substantially pointed portion to facilitate insertion into the rock strata 13 either as the rod 11 forms its own hole in the rock strata 13 or as the rod 11 is inserted longitudinally into a preformed hole 16 formed in the rock strata 13.

A cooperating and compatible roof support plate 17 is adapted to engage the roof and is held against the roof by the pin head 14. This roof support plate 17 is provided with an aperture 20 having a cross-section with corners 21 that engage the corners 12 of the rod 11 for turning the rod 11 into the roof strata 13 as the rod 11 is moved relatively longitudinally and axially through the aperture 20.

The roof support plate 17 is provided with upstruck triangular portions 22, providing means for gripping the roof and precluding turning of the plate 17 relative to the roof as the rod 11 is moved longitudinally through the plate aperture 20 and turned longitudinally into the roof strata 13. Moveover, these triangularly-shaped gripping portions 22 of plate 17 grip the roof and preclude relative turning of the plate 17 and roof, and preclude relative turning of the plate 17 and rod 11 after the rod 11 is inserted into the roof, for precluding unturning and unintentional removal of the rod 11 from the roof strata 13 as roof load is applied longitudinally and axially to the rod 11. It will be understood that the roof-gripping means, provided by the upturned triangular plate portions 22 in the embodiment shown, may also be provided by upturning the corners of the plate 17 or by driving gripping means directly into the roof through the plate 17.

It is thought that the usage of the roof support pin 10 has become fully apparent from the foregoing detailed description of parts but for completeness of disclosure, the insertion of the roof support pin 10 will be briefly described. It will be assumed that either a preformed hole 16 has been provided in the roof strata 13, in which case, the longitudinal hole 16 is of a smaller cross-sectional dimension than the rod cross-sectional dimension. As will be understood, in this instance, the corners 12 constituting the helical fins, cut into the wall of the performed hole 16 to provide their own helical grooves 23 as is best shown in FIG. 2. Of course, a preformed longitudinal hole 16 need not be provided. In this instance, the rod 11 forms its own longitudinal hole and the corners 12 constituting the helical fins cut into the roof strata 13 to provide their own helical grooves for gripping the roof strata 13.

First, the roof support plate 17 is located in its appropriate position against the roof and the plate-gripping portions 22 are inserted into the roof strata 13 to attach the plate 17 to the roof and preclude relative turning movement. In that instance in which a preformed longitudinal hole 16 is provided in the roof strata 13, the plate aperture 20 is aligned with the hole 16. Then, the pointed end portion 15 of rod 11 is inserted into and through the plate aperture 20 and into the roof. Suitable mechanism, seats and engages the pin head 14 to push the elongate rod 11 upwardly through the plate aperture 20 and into either the preformed roof hole 16 or directly into the roof strata 13. As the rod 13 moves longitudinally relatively through the plate aperture 20, the corners 12 constituting the helical fins engage the compatible corners 21 of the plate apertures 20, thereby causing the elongate rod 11 to turn. During this action, incident to insertion of the rod 11 into the roof strata 13, the corners 12 constituting the helical fins of rod 11 cut into the wall of a preformed hole 16 to provide their own helical grooves 23 for gripping the roof strata as the rod 11 is turned incident to insertion. When a preformed hole 16 is not utilized, the corners 12 constituting the helical fins of the elongate rod 11 cut into the roof strata 13 to provide their own helical grooves for gripping the roof strata 13 as the rod is turned incident to insertion of the rod 11 into the roof.

After the rod 11 has been inserted into the roof strata 13 in the manner previously described in detail, the rod 11 is precluded from unturning from the roof strata 13 and from being removed from the roof strata 13 because the roof support plate 17 grips the roof and precludes relative turning of the plate 17 and the roof and also precludes relative turning of the plate 17 and the rod 11, upon application of a load force from the roof longitudinally and axially along the support rod 11.

It will be understood that the effective gripping action of the rod 11 with the roof strata 13 can be controlled by the length of the longitudinal corners 12 constituting the helical fins, and by the depth of the helical grooves 23 formed in the rock strata 13 by the rod corners 12.

In that species illustrated by FIGS. 1–3, the elongate rod 11 is provided with a square cross-section, providig four corners 12 that constitute the helical fins. Similarly, the aperture 20 in the roof support plate is provided with a square cross-section to provide four compatible corners 21 that engage the corners 12 of the square rod 11. As described previously, upon insertion of the rod 11, the four rod corners 12 engage the four plate aperture corners 21 as the rod 11 is moved longitudinally through the plate aperture 20 so as to cause a turning of the rod 11 and consequently a formation of compatible grooves in the rock strata 13 by the rod corners 12 constituting the helical fins.

In that species illustrated in FIGS. 4 and 5, the cross-section of the rod 11 is triangular to provide three corners 12 constituting the helical fins. The compatible aperture 20 formed in the roof support plate 17 is also triangular to provide three compatible corners 21 that effectively engage and act upon the three corners 12 of this triangularly shaped rod 11. Again, upon insertion of the rod 11 into the roof strata 13 upon longitudinal relative movement through the plate aperture 20, the compatible rod corners 12 and plate aperture corners 21 effectively engage and cause a turning of the rod 11, thereby causing the three rod corners 12 constituting the helical fins to form effective three helical grooves in the roof strata 13 for gripping and holding the rod 11.

In that species illustrated in FIG. 6, the rod 11 is provided with a cruxiform cross-section to provide effectively four corners 12 constituting the helical fins. The roof support plate 17 is provided with a compatible aperture 20 of a cruxiform cross-section providing four corners 21 that effectively receive and engage the four corners 12 of the cruxiform cross-sectional rod 11. Upon insertion of the rod 11 into the roof strata 13 as the rod 11 is moved longitudinally through the plate aperture 20, the coacting and engageable rod corners 12 and aperture corners 21 turn the cruxiform-shaped rod 11 so that the rod corners 12 constituting the helical fins, form compatible and conforming helical grooves in the rock strata 13 to hold the pin rod 11 firmly in place.

I claim as my invention:

1. A roof support assembly for a roof, comprising:
   (a) roof support pin including an elongate rod having a non-circular cross-section to provide corners, the rod being twisted in one direction so that the corners provide longitudinal substantially helical fins, and
   (b) a roof support plate held stationary relative to the roof and provided with an aperture in which the rod is received, the aperture having a cross-section with corners that engage corners of the rod cross-section for postitively turning the rod and rod corners into the roof strata as the rod is moved relatively longitudinally through the aperture.

2. A roof support assembly as defined in claim 1, in which:
   (c) the plate aperture is provided with substantially the same cross-section as the rod cross-section, and has corners that engage the corners of the rod for positively turning the rod and rod corners into the roof strata as the rod is moved relatively longitudinally through the plate aperture.

3. A roof support assembly as defined in claim 2, in which:
   (d) the rod cross-section and the roof support plate aperture cross-section are substantially square for providing compatible four corners that interengage, the rod being positively turned by the interengagement of the corners as the rod is moved relatively longitudinally through the plate aperture.

4. A roof support assembly as defined in claim 2, in which:
   (d) the rod cross-section and the roof support plate aperture cross-section are substantially triangular for providing compatible three corners that interengage, the rod being positively turned by the interengagement of the corners as the rod is moved relatively longitudinally through the plate aperture.

5. A roof support assembly as defined in claim 2, in which:
   (d) the rod cross-section and the roof support plate aperture cross-section are substantially a cruxiform for providing compatible four corners that interengage, the rod being positively turned by the interengagement of the corners as the rod is moved relatively longitudinally through the plate aperture.

6. A roof support assembly as defined in claim 1, in which:
   (c) the roof support plate is provided with means for gripping the roof and precluding turning of the plate relative to the rod as the rod is moved longitudinally through the plate aperture and twisted into the roof strata.

7. A roof support assembly as defined in claim 6, in which:
   (d) the roof support plate means gripping the roof precludes relative turning of the plate and rod after the rod is inserted into the roof, and precludes untwisting of the rod from the roof strata.

8. A roof support assembly as defined in claim 7, in which:
   (e) the plate means for gripping the roof is upturned from the plate.

9. A roof support assembly as defined in claim 1, for a roof having a preformed longitudinal hole of a smaller cross-sectional dimension than the rod cross-section dimension, in which:
   (c) the rod corners cut into the wall of the preformed hole to provide helical grooves for gripping the roof strata as the rod is positively turned by the plate aperture incident to insertion of the rod longitudinally into the preformed hole.

10. A roof support assembly as defined in claim 1, in which:
    (c) the rod forms its own longitudinal hole in the roof and the rod corners cut into the roof strata to provide helical grooves for gripping the roof strata as the rod is positively turned by the plate aperture incident to insertion of the rod into the roof.

* * * * *